May 21, 1935.  C. L. SEWARD, JR  2,001,853
LIQUID LEVEL INDICATOR
Original Filed Dec. 14, 1932   2 Sheets-Sheet 1
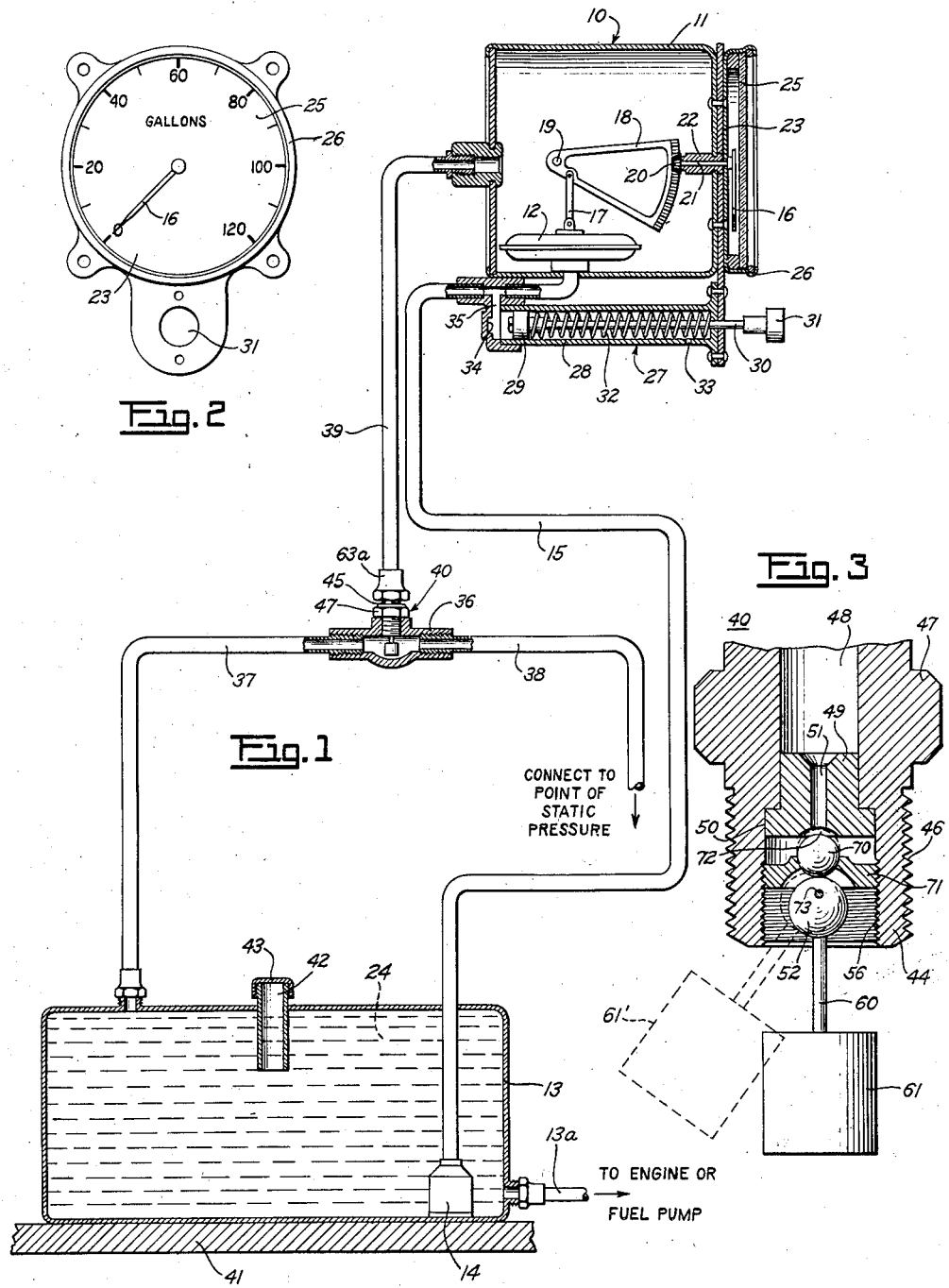

May 21, 1935.    C. L. SEWARD, JR    2,001,853
LIQUID LEVEL INDICATOR
Original Filed Dec. 14, 1932    2 Sheets-Sheet 2
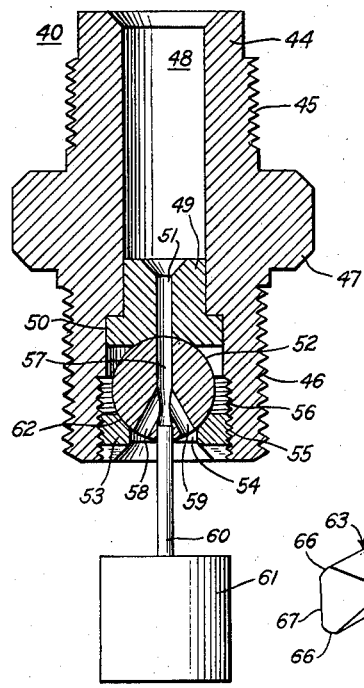
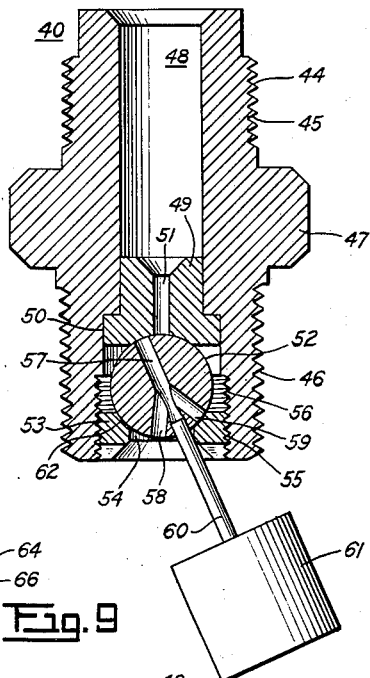
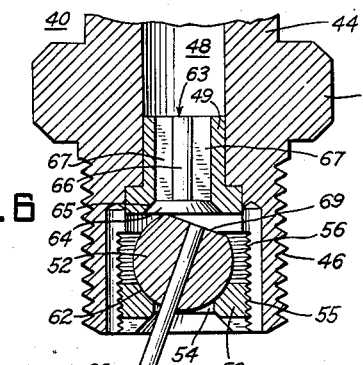
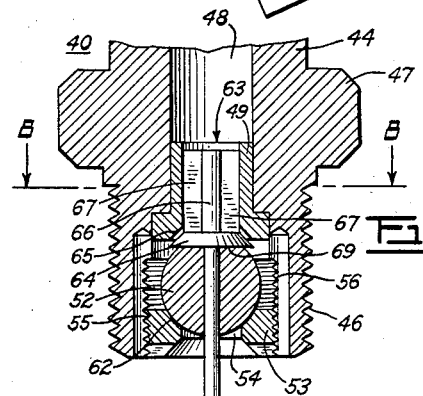
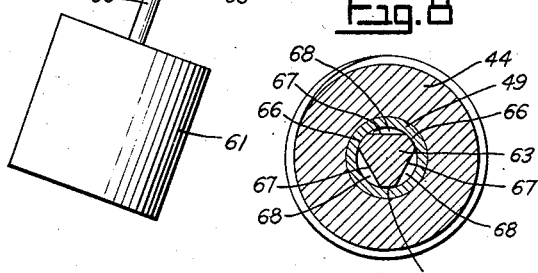
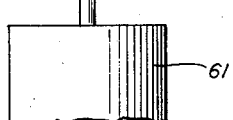
INVENTOR.
Clarence L. Seward, Jr.
BY Stephen Cerstvik
ATTORNEY.

Patented May 21, 1935

2,001,853

UNITED STATES PATENT OFFICE 2,001,853

LIQUID LEVEL INDICATOR

Clarence Lee Seward, Jr., Washington, D. C., assignor to Bendix Aviation Corporation, South Bend, Ind., a corporation of Delaware Original application December 14, 1932, Serial No. 647,290. Divided and this application June 9, 1934, Serial No. 729,857

4 Claims. (Cl. 73—54)

The present application is a division of my co-pending application Serial No. 647,290, filed December 14, 1932, and the invention herein disclosed relates to liquid level indicators of the remote type such, for example, as are disclosed in U. S. Patents Nos. 1,711,506 and 1,711,507 issued to Morris M. Titterington on March 7, 1929, and more particularly, the invention refers to means for preventing liquid from entering the indicator from the supply tank while providing a common venting connection for the indicator and for the supply tank with which it is associated.

One of the objects of the invention is to provide, in combination with a liquid level indicator, novel venting means for the indicator and the container or tank with which it is associated whereby, under certain extreme conditions, liquid is prevented from entering the indicator from the container or tank.

Another object is to provide, in a device of the class described adapted to be mounted on a vehicle and having a common venting connection from the supply tank and the indicator to the atmosphere or to some suitable point of static pressure, novel means whereby the connection between the tank and the indicator is automatically closed upon acceleration of the vehicle or upon inclination thereof in any direction with respect to the horizontal so that liquid from the supply tank is prevented from entering the indicator.

A further object of the invention is to provide novel means, in combination with a liquid fuel level indicator of the hydrostatic type particularly adapted for use on aircraft, whereby the fuel supply tank and the indicator may be vented to a common remote point while preventing passage of fuel from the tank to the indicator upon acceleration of the aircraft or upon departure thereof from normal level flight, without stopping the supply of fuel to the engine of the aircraft, as, for example, when the aircraft is deliberately put into a power dive.

The above and other objects and advantages of the invention will appear more fully hereinafter with reference to the detailed description which follows, when taken in connection with the accompanying drawings wherein several embodiments of the invention are illustrated. It is to be expressly understood, however, that the drawings are for the purposes of illustration and description only and are not designed as a definition of the limits of the invention, reference being had for this purpose to the appended claims.

In the drawings wherein like reference characters refer to like parts throughout the several views:

Fig. 1 illustrates a vertical section taken through the liquid level indicating device, through the novel venting valve of the invention and through the supply tank, and showing the connections between the three elements mentioned;

Fig. 2 is a front elevation of the indicating device;

Fig. 3 is a vertical section of one form of venting valve embodying the invention;

Fig. 4 is a sectional view of another form of valve embodying the invention;

Fig. 5 is a view similar to Fig. 4 showing the manner of operation of the valve upon actuation of the pendulum by either acceleration forces, centrifugal forces, or gravity;

Fig. 6 is a vertical section of still another form of pendulum controlled valve in its actuated position;

Fig. 7 is a similar view showing the valve of Fig. 6 in normally open position;

Fig. 8 is a transverse section taken along the line 8—8 of Fig. 7; and

Fig. 9 is a detailed perspective of one of the elements of the valve shown in Figs. 6, 7 and 8.

Referring more particularly to Fig. 1 of the drawings, the liquid level indicating device or gage 10 comprises a casing 11, a flexible diaphragm device 12 which is responsive to pressures transmitted thereto from the tank 13 by means of a hydrostatic cell 14 and the pipe connection 15. Movements of the pressure-responsive device 12 are transmitted to a pointer 16 in any suitable manner as by means of a link 17 which is connected to the rack 18 pivotally mounted at 19 and adapted to mesh with a pinion 20, the latter being connected to the pointer 16 by means of a pointer shaft 21 journaled in a bushing 22 carried by and at the front of the casing. Associated with the pointer 16 is a dial 23 for the purpose of giving indications of the level of the liquid 24 in the tank 13. The pointer 16 and the dial 23 may be covered by a member 25 of some suitable transparent material, preferably unbreakable, such as celluloid, and supported in a frame 26.

Associated with the gage 10 is a pump 27 which comprises a cylinder 28 and a piston 29 reciprocally mounted therein, the latter being in the form of a flexible cup carried at one end of the rod 30. At the other end of the rod 30 there is provided a knob 31 for the purpose of manually operating the pump by pulling said cup outwardly against the compression of a spring 32 surrounding the rod 30 and interposed between the piston 29 and a wall of the cylinder 28. An opening 33 is provided in the cylinder for admitting air thereto on the outward stroke of the piston 29. Normally the piston 29 abuts the end wall 34 thereby maintaining the passage 35 closed with respect to the cylinder 28. The gage and pump are adapted to be mounted on an instrument panel (not shown) of a vehicle such as an aircraft, automobile, and the like.

The interior of the gage casing 11 and the top of the supply tank 13 have a common venting connection to the atmosphere at some suitable remote point by means of a T-connection 36, one end of which is connected to the tank 13 by means of a pipe 37, and the other end of which is connected to the point of static pressure (not shown) by pipe 38. The interior of the gage casing 11 is connected to the T by means of a pipe 39 through the novel venting valve 40 which is normally open and which will be described more fully hereinafter. The tank 13 may be carried on any suitable support shown generally at 41 and constituting a part of the vehicle on which the indicator 10 is adapted to be carried and is provided with a filling opening 42 which is closed by a threaded cup 43. A supply pipe 13a is connected to the bottom of the tank 13 for supplying fuel directly to the engine of the vehicle or through a fuel pump when forced feed is employed.

The operation of the liquid level indicating device 10 as a simple hydrostatic gage is as follows:

Assuming that there is no liquid in the tank 13 and initially the system, including the tank, is full of air, then as liquid is poured into the tank 13, it rises in the hydrostatic cell 14 and compresses the air contained in the cell and in the pipe 15 in accordance with the hydrostatic head of the liquid. This pressure is then transmitted to the gage through the pipe 15 and to the pressure-responsive member 12 which causes the operation of the pointer 16 by means of the shaft 21, pinion 20 and rack 18. The dial 23 of the gage may be calibrated so that it will indicate the level of the liquid in inches, gallons, pounds or some other function of pressure-head as may be desired.

If the maintenance of a constant amount of air in the system could be assured, the gage would continue to indicate the level of the liquid correctly at all times. It has been found, however, that various factors contribute to making it difficult or practically impossible to maintain the air in the system without auxiliary means. Changes in temperature, changes in pressure, minute leaks and other effects tend to reduce the amount of air in the system and thereby reduce the indication of the gage and render it undependable as a quantitative indicator of the liquid level. Means are, therefore, provided for replenishing the air in the system to compensate for losses due to the factors recited, said means comprising the pump 27.

The cooperative function of the pump 27 with the gage 10 is as follows:

When it is desired to ascertain accurately the liquid level in tank 13, it is necessary to expel all liquid from the pipe 15 and cell 14. The piston rod 30 of the pump is, therefore, pulled outward to the right as viewed in Fig. 1, and then released so that the spring 32 causes the piston 29 to be pushed back to its normal position so that it abuts the wall 34 and closes the passage 35. On the outward stroke of the piston rod 30 the flexible cup 29 permits flow of air around its periphery 10, which air is admitted into the cylinder through the opening 33. On the return stroke the cup expands against the walls of the cylinder and prevents the escape of air past it. The air is, therefore, delivered through passage 35 into the pipe 15 and is blown out of the bottom of the hydrostatic cell 14 thereby clearing the system of liquid and providing sufficient air within the pipe 15 for the transmission of the hydrostatic head of the liquid 24 to the pressure-responsive member 12. The indication of the gage following this clearing of the pipe-line 15 and cell 14 and the replenishing thereof with air, will be the correct level of the liquid in the tank.

Heretofore, it had been the practice to merely leave the tank 13 and the gage casing 11 open to the atmosphere by an aperture provided in each for proper venting thereof without any connection therebetween. Such an arrangement functioned satisfactorily when employed on automobiles where the static pressures at the gage and at the tank are substantially the same. In aircraft, however, such as airplanes, particularly planes provided with wing tanks, considerable difficulty was experienced with hydrostatic gages due to the differences in static pressure within the gasoline tank which is vented to the exterior of the plane, and in the gage which is generally located on the instrument panel in the cockpit of the plane. Therefore, a liquid level indicating gage, such as a gasoline gage, would indicate differently with the aircraft in flying position on the ground (i. e., the tail propped up to give the tank a true horizontal position for calibrating the tank and gage) and with the aircraft in actual flight, due to additional pressure being introduced into the tank produced by wind velocity exterior of the plane when the latter is in flight. It is, therefore, essential that the gasoline gage be vented to the same place as the tank and preferably to some suitable remote point of static pressure, although the particular point of connection may be at some velocity pressure without making any substantial difference, since no difference in pressure will result so long as the tank and the gage are connected to the same point. To this end the present invention provides novel means for providing a common connection from the gage and the tank to some suitable remote point (not shown) as, for example, to a Pitot-static tube carried on the leading edge of the wing of an aircraft, said means being effective upon acceleration of the aircraft or upon departure thereof from normal flight, to close the connection between the tank and the gage for preventing the passage of the liquid fuel from the tank to the gage while permitting the feeding of the liquid fuel to the engine of the aircraft as, for example, when the aircraft is deliberately put into a power dive, at which time the acceleration forces are excessive. The device consists generally of a vent valve adapted for connection in the pipe-line constituted by pipes 37, 38 and 39, said valve comprising a body portion having means thereon for connecting it into said pipeline, means forming a passage through said body portion and means including a universally mounted pendulum suspended from the body portion to close said passage upon movement of said pendulum in any direction with respect to the body portion.

Referring more particularly to Figs. 4 and 5 of the drawings, wherein one form of a novel vent valve adapted for use in accordance with the invention is illustrated, said valve comprises a tubular body portion 44 provided with external threads 45 and 46, respectively, at each end thereof and with a hexagonal nut portion 47 in order that a suitable wrench may be applied thereto for securing the valve in the pipe-line by means of coupling members which are adapted to engage the valve by means of the threads 45 and 46. The valve has a passage 48 extending therethrough which is restricted at the lower end of the valve by means of a bushing 49, the latter having an annular flange 50 and may be press-fitted within the passage 48 near the lower end thereof and which has a relatively narrow passage 51 therein. Associated with the bushing 49 and cooperating with the lower end thereof is a spherical member or ball 52 which is seated on an annular supporting member 53 having a central opening 54 and being secured within the lower end of the valve by means of external threads 55 which engage with internal threads 56 provided on the inside of the valve. The spherical member or ball 52 is provided with a relatively small passage 57, terminating in a pair of diverging passages 58 and 59, respectively. Secured to or formed integral with the ball 52 is a rod 60 having at its other end a weighted mass 61 which constitutes a pendulum having a universal support formed by the ball 52 which is seated within a spherical seat 62 provided on the upper side of the supporting member 53. Hence the pendulum 61 is adapted for universal movement in any direction with respect to the vertical axis of the valve. When the pendulum 61 and the valve 40 are normally in vertical position, the passage 57 in the ball 52 is in alignment with the restricted passage 51 so that a clear path is provided through the body portion 44 of the valve by means of the passage 48 and passages 51, 57, 58 and 59. If, however, either the body portion 44 is inclined to the vertical, the pendulum 61 being held in position by the force of gravity, or if the pendulum 61 is affected by either acceleration forces or centrifugal forces, thereby moving it with respect to the body portion 44 of the valve, the relative positions of the valve body and the pendulum will be as shown in Fig. 5, thereby closing the restricted passage 51 and hence closing the valve. As shown in Fig. 1, the valve is adapted for connection to the T-coupling 36 so that the threaded portion 46 of the valve is screwed into the T-coupling and the threaded portion 45 is connected to the pipe 39 by means of a coupling member 63a. Thus it will be seen that when the pendulum 61 is actuated, the passage to the interior of the gage casing 11 is closed and no liquid can pass from the tank 13 through the pipe 37 to the interior of the gage casing 11, although the passage between pipes 37 and 38 is unobstructed, thereby permitting the flow of liquid from the tank 13 to the engine or fuel pump through the supply pipe 13a.

Referring now to Figs. 6, 7, 8 and 9, there is shown another form of a novel pendulum controlled valve adapted for use with the present invention, wherein the bushing 49 is provided with a relatively large opening in which an operating member having a substantially triangular cross-section is located, said member being provided with a valve head 64 which is adapted to be seated against a valve seat 65 formed at the bottom of the bushing 49. The edges of the member 63 are rounded as at 66, in order that they may fall flush against the internal surface of the bushing 49 as shown in Fig. 8. The sides 67 of the valve member, however, form passages 68 between said member and the bushing 49, which passages are closed when the head 64 of the valve member is forced against the seat 65 of the bushing 49. In order to operate the valve member 63 within the bushing 49 and against the valve seat 65, the spherical-shaped member or ball 52 is flattened at the top thereof as indicated at 69 so that when the pendulum 61 which operates the ball 52 is in a normal vertical position, as shown in Fig. 7, the valve member 63 is permitted to drop down from the bushing 49 and to rest on said flattened surface 69 thereby opening the passages 68 and providing a clear path through the valve, but when there is relative movement between the pendulum 61 and the body portion 44 of the valve, the ball 52 operates somewhat like a cam, thereby raising the valve member 63 and causing the head 64 thereof to be seated against the valve seat 65, thus closing the passages 68 and, hence, the valve. This form of valve is adapted for connection into the pipe-line in the same manner as the form shown in Figs. 4 and 5 and operates in the same manner to close the passage to the interior of the gage casing 11 so that no liquid can pass thereto from the tank 13.

In Fig. 3 there is illustrated still another embodiment of a novel valve which may be utilized with the invention, in which, however, the pendulum is adapted for movement only about one axis, preferably an axis parallel to or coinciding with the transverse axis of the vehicle so that said pendulum may be actuated by acceleration and deceleration forces acting along the longitudinal axis of the vehicle or by the action of gravity when the vehicle is inclined upward or downward. In this embodiment, the valve is provided with a similar bushing 49 as in the form shown in Figs. 4 and 5 and having a restricted passage 51. The latter, however, is adapted to be closed by means of a ball 70 which normally rests on a support 71. The ball 70 is adapted to be moved into a recess 72 provided at the bottom of the bushing 49 by a cam action of the ball 52 for which purpose said ball 52 is eccentrically pivoted within the lower end of the body portion 44, as by means of a pin 73 which extends through the ball 52 and is secured to the body portion 44 at points diametrically opposite each other. The ball 52 is actuated on its pivot 73 by means of the pendulum 61 and rod 60 in the same manner as in the valves shown in Figs. 4 to 7, inclusive. The closed position of the valve is shown in dotted lines in this figure and in this position the pendulum 61 is moved to the left as indicated at 61'.

There is thus provided a novel combination and arrangement including a liquid level indicator of the hydrostatic-cell type and venting means for the indicator and for the container or tank with which it is associated whereby, under certain extreme conditions as on an aircraft in inverted flight, liquid is prevented from entering the indicator from the container or tank.

Although several embodiments of a valve have been shown, it will be apparent that the present invention is not limited to the valve structure. Reference is, therefore, to be had to the appended claims for a definition of the limits of the invention.

What is claimed is:

1. In combination with a fuel tank adapted to be carried by an aircraft having an instrument panel, a pressure responsive gage remote from said tank and adapted to be mounted on said instrument panel for indicating the quantity of fuel in said tank in accordance with the pressure-head of said fuel, said gage including a casing, an indicator, a pressure-responsive member in said casing, and means for actuating said indicator by movement of said pressure-responsive means, a hydrostatic cell immersed in the fuel in said tank to the maximum depth of the fuel, a pipe-line connecting said cell to said pressure-responsive means whereby pressures corresponding to the height of the fuel in the tank are transmitted to the gage, means including a second pipe-line connecting the tank and the gage casing to a common venting point, and means connected in said second pipe-line and controlled by forces of acceleration and gravity acting about either the transverse or the longitudinal axis of the aircraft for closing the connection between the tank and the gage casing to prevent passage of fuel into said casing due to acceleration of the aircraft and when said aircraft departs from level flight.

2. In combination with a fuel tank adapted to be carried by an aircraft having an instrument panel, a pressure-responsive gage remote from said tank and adapted to be mounted on said instrument panel for indicating the quantity of fuel in said tank in accordance with the pressure-head of said fuel, said gage including a casing, an indicator, a pressure-responsive member in said casing, and means for actuating said indicator by movement of said pressure-responsive means, a hydrostatic cell immersed in the fuel in said tank to the maximum depth of the fuel, a pipe-line connecting said cell to said pressure-responsive means whereby pressures corresponding to the height of the fuel in the tank are transmitted to the gage, means including a second pipe-line connecting the tank and the gage casing to a common venting point, and means associated with said pipe-line and controlled by forces of acceleration and gravity acting in any vertical plane for closing the connection between the tank and the gage casing to prevent passage of fuel into said casing due to acceleration of the aircraft and when said aircraft departs from level flight, said last-named means comprising a pendulum controlled valve.

3. In combination with a fuel tank adapted to be carried by an aircraft having an instrument panel, a pressure-responsive gage remote from said tank and adapted to be mounted on said instrument panel for indicating the quantity of fuel in said tank in accordance with the pressure-head of said fuel, said gage including a casing, an indicator, a pressure-responsive member in said casing, and means for actuating said indicator by movement of said pressure-responsive means, a hydrostatic cell immersed in the fuel in said tank to the maximum depth of the fuel, a pipe-line connecting said cell to said pressure-responsive means whereby pressures corresponding to the height of the fuel in the tank are transmitted to the gage, means including a second pipe-line connecting the tank and the gage casing to a common venting point, and means associated with said second pipe-line and controlled by forces of acceleration and gravity for closing the connection between the tank and the gage casing to prevent passage of fuel into said casing due to acceleration of the aircraft and when said aircraft departs from level flight, said last-named means comprising a valve having a universally mounted pendulum associated therewith for controlling said valve irrespective of the direction of the acceleration forces and the direction of departure of the aircraft from level flight.

4. In combination with a hydrostatic fuel level gage for vehicles, a fuel tank adapted to be carried by the vehicle, means connecting said gage and tank for operating the former by the pressure-head of the fuel in the latter, means connecting the interior of said gage and said tank to a common venting point, and a valve including a universally mounted pendulum for closing the connection between the interior of the tank and the interior of the gage when the vehicle is accelerating or decelerating, or is inclined in any direction with respect to the horizontal.

CLARENCE LEE SEWARD, Jr.